July 15, 1958   G. V. W. ROTH ET AL   2,843,728
AIRCRAFT LIGHTING AND SIGNALING STRUCTURE
Filed Oct. 7, 1954   3 Sheets-Sheet 1
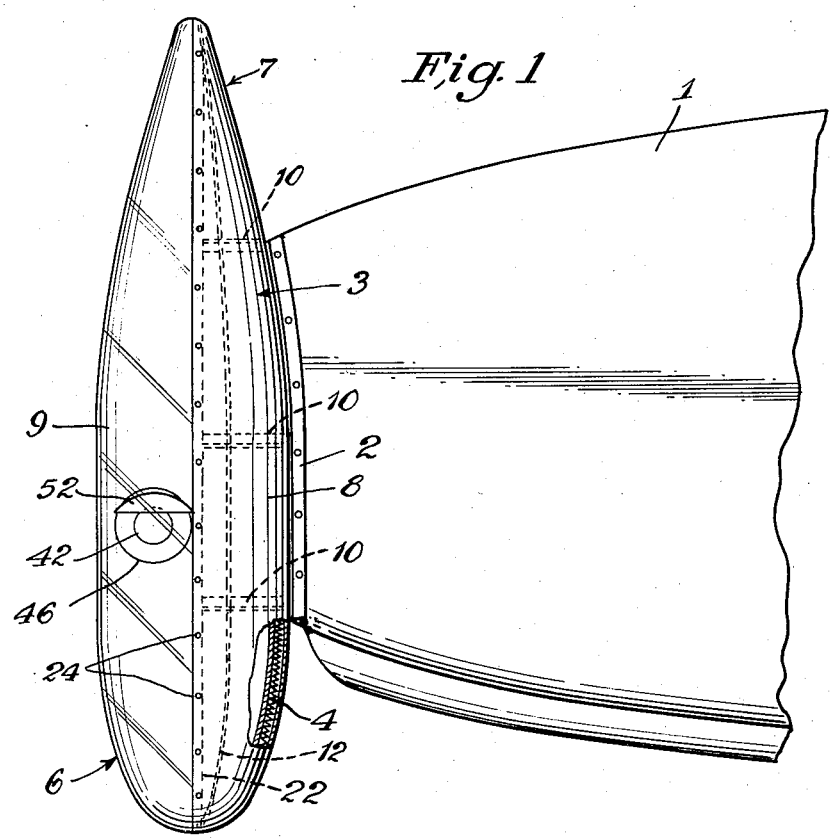
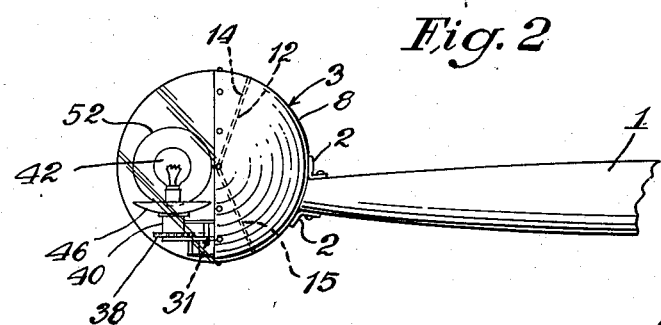
Inventors
Grant V. W. Roth
Lester V. Walsh
by Parker & Carter
Attorneys July 15, 1958     G. V. W. ROTH ET AL     2,843,728
AIRCRAFT LIGHTING AND SIGNALING STRUCTURE
Filed Oct. 7, 1954     3 Sheets-Sheet 2
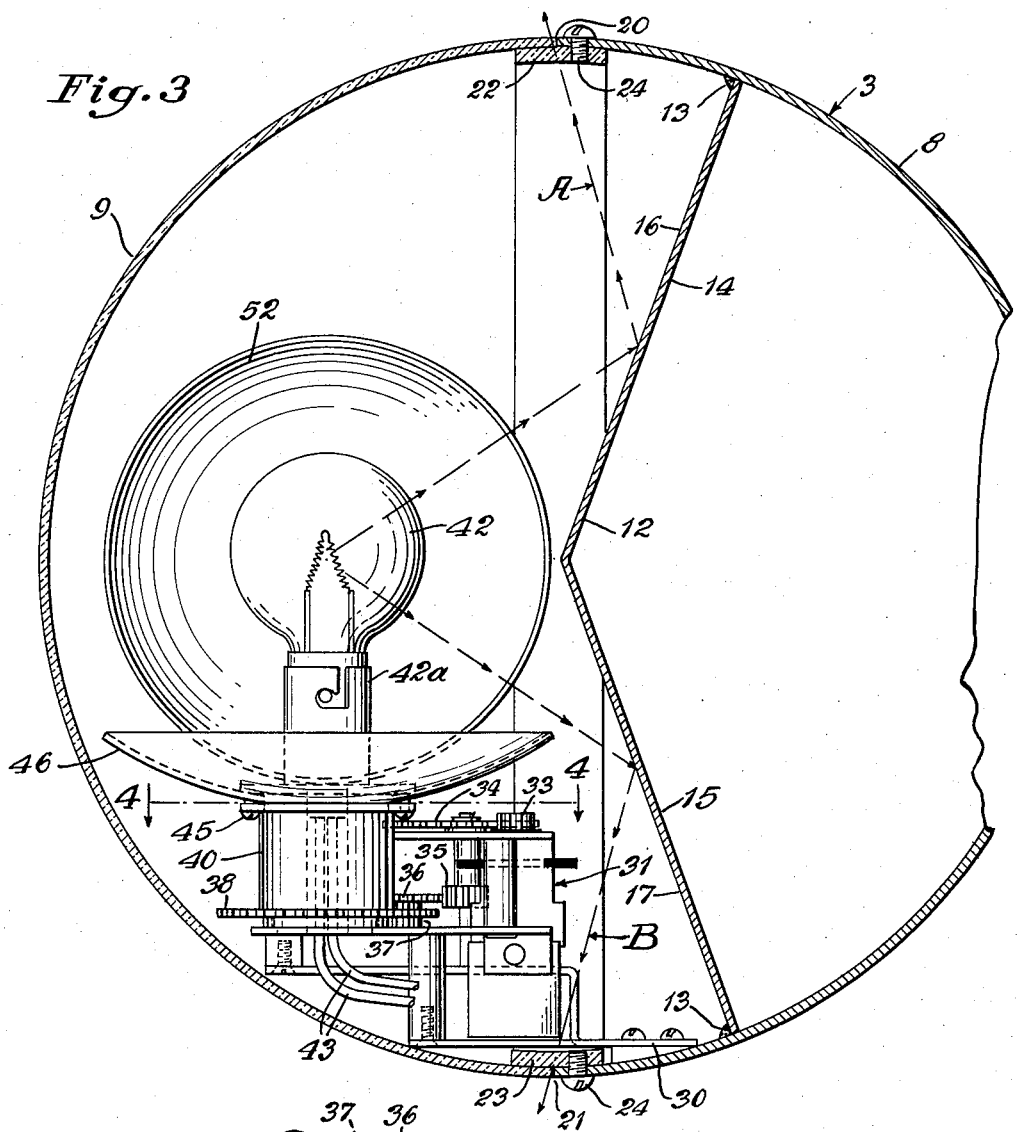
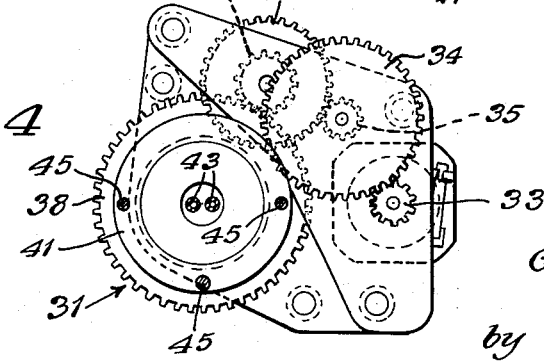
Inventors
Grant V. W. Roth
Lester V. Walsh
by Parker & Carter
Attorneys July 15, 1958  G. V. W. ROTH ET AL  2,843,728
AIRCRAFT LIGHTING AND SIGNALING STRUCTURE
Filed Oct. 7, 1954  3 Sheets-Sheet 3

Inventors
Grant V. W. Roth
Lester V. Walsh
by Parker & Carter
Attorneys

United States Patent Office 2,843,728
Patented July 15, 1958

1

2,843,728

AIRCRAFT LIGHTING AND SIGNALING STRUCTURE

Grant V. W. Roth and Lester V. Walsh, Chicago, Ill.

Application October 7, 1954, Serial No. 460,884

3 Claims. (Cl. 240—7.7)

Our invention relates to aircraft lighting and signaling structures and has for one purpose the provision of such a structure which shall be effective to provide a beam of light emanating from an aircraft and observable from a variety of positions relative to said aircraft.

Another purpose is to provide an aircraft lighting and signaling device effective to produce a variety of light patterns at a variety of points.

Another purpose is to provide an aircraft light structure having a housing member which will create a minimum resistance to movement through the air.

Another purpose is to provide a lighting structure which may be installed, for example, at the wing tips of an aircraft and which shall result in improved aerodynamic characteristics of the total wing structure.

Other purposes will appear from time to time in the course of the specification and claims.

We illustrate our invention more or less diagrammatically in the accompanying drawings wherein:

Figure 1 is a top plan view with parts broken away and showing our device along with a portion of an aircraft wing with which it may be employed;

Figure 2 is a front elevation illustrating the device of Figure 1;

Figure 3 is a view similar to that of Figure 2 on an enlarged scale and with parts in cross section;

Figure 4 is a detailed view taken on the line 4—4 of Figure 3;

Like parts are indicated by like symbols throughout the specification and drawings.

Figure 5:
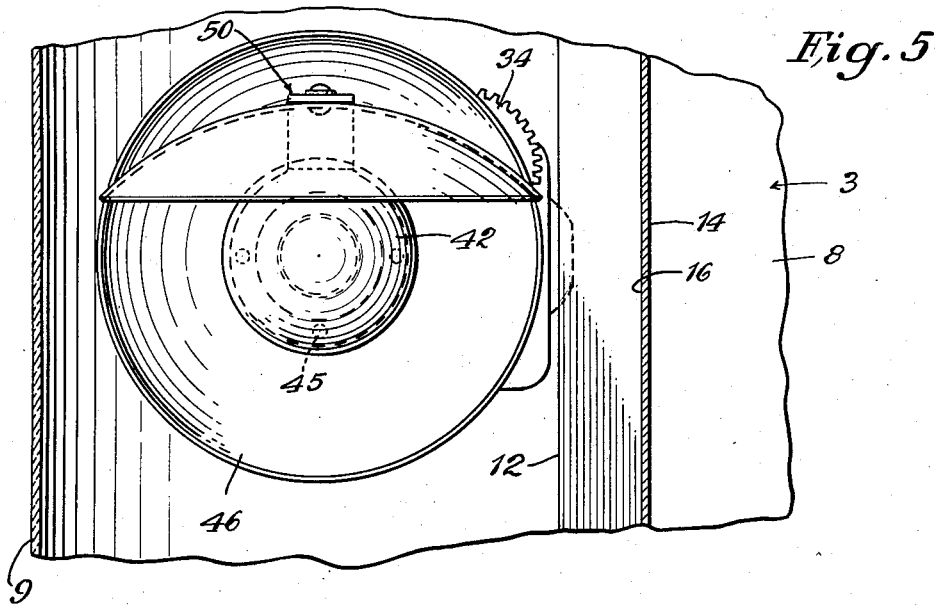
Figure 5 is a top view of the structure illustrated in Figure 3.

Referring now to the drawings and particularly to Figure 1, numeral 1 generally indicates the outer end section of an aircraft wing. Secured to the outer wing section 1 by any suitable securing means, as by angle members generally indicated at 2, is a light housing member indicated by the numeral 3. A portion of the housing member 3 is broken away in Figure 1 in order to illustrate, as at 4, a suitable heating means. The heating means 4 is shown diagrammatically as comprising the well-known electrical or hot wire expedient. It will be realized that the heating means 4 could be installed also along an adjacent portion of the edge of the wing portion 1. The particular means of heating the forward portion of the wing section 1 and housing 3 adjacent their point of juncture may be varied without departing from the nature and scope of our invention. It will be understood that at this particular point the possibility of the accumulation of undesirable ice formation may occur in flight under certain meteorological conditions.

The housing element 3 is generally cylindrical intermediate its ends and has the rounded conical forward and rear end portions generally indicated by the numerals 6, 7. As best seen in Figures 1 and 3, the housing member 3 is formed in two equal longitudinal shell-like elements 8, 9. The inner half 8 of the housing 3, which is attached to the wing section 1, may be formed of metal and may have, as indicated in dotted lines at 10 in Figure 1, a plurality of stiffeners or semicircular, laterally disposed rib members 10.

As indicated in dotted lines in Figures 1 and 2 and in cross section in Figure 3, the inner housing element 8 may have extending longitudinally therethrough a light-reflecting member 12. The member 12 may be secured along its upper and lower longitudinal edges to the inner surface of the housing member 8 in any suitable manner as for example by the welds 13 illustrated in Figure 3. The member 12 comprises an upper portion 14 lying in a plane extending from a point generally adjacent the longitudinal axis of the housing member 3 upwardly and outwardly away from the vertical axis of the housing member 8 and a lower portion 15 lying in a plane extending from the same point adjacent the longitudinal axis of the member 3 downwardly and outwardly from the vertical axis of the member 3. The outer surfaces 16, 17, respectively, of the reflector portions 14, 15 are of such material as to be effective to reflect outwardly therefrom a light beam which may impinge thereon.

That half of the housing member 3 indicated by the numeral 9 is formed of a translucent material, such as a suitable plastic. The element 9 in cross section has the same arc of curvature as that of the element 8 and, as best seen in Figure 3, the longitudinal edges of the members 8, 9 are so formed as to abut, as indicated at 20 and 21, to form a smooth, continuing generally cylindrical surface.

The housing element 9 may be connected to the element 8 in any suitable manner. We illustrate in Figure 3, as one example, the provision of a strip member 22 which may be integral with, or may be secured to, the inner surface of the element 9 along and adjacent its longitudinal edges. The strip members 22, 23 have a portion extending beyond the longitudinal edges of the element 9 and lying beneath and above the opposed longitudinal edges of the element 8. Suitable securing means, such as the screws generally indicated at 24, may be employed to connect the elements 8 and 9 together.

A bracket member 30 may be secured in any suitable manner to the lower inner surface of the housing element 8 between its lower longitudinal edge and the reflector portion 15. Mounted on the bracket 30 is a light beam-moving structure indicated generally by the numeral 31.

Figure 6:
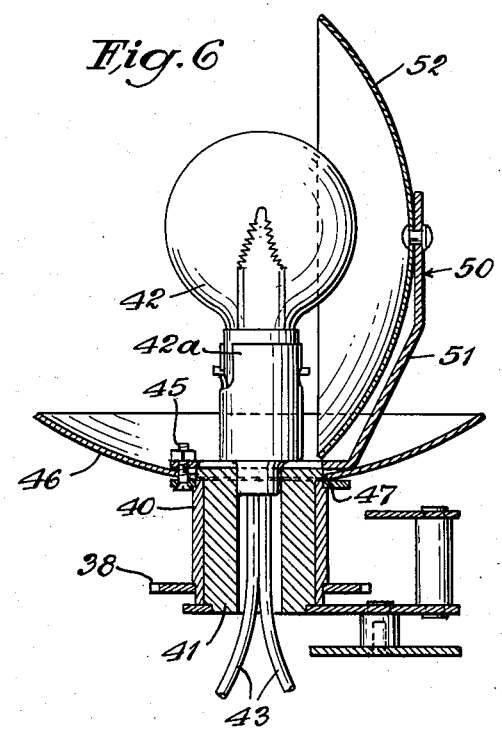
Figure 6 is a side view in partial cross section illustrating a portion of the lighting structure illustrated in Figure 3.
Figure 7:
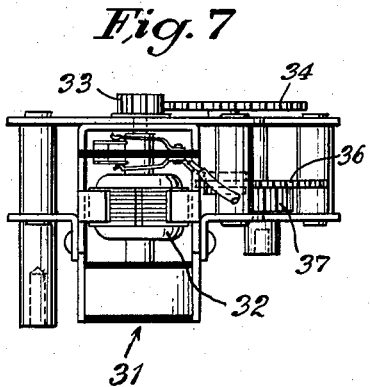
Figure 7 is a side elevation of the driving mechanism.

As shown in detail in Figure 7, the light beam-creating and moving structure may comprise a motor means 32 which may be connected in any suitable manner to a source of electrical energy within the housing member or within the airplane to which it is attached. The motor member 32 drives a gear 33 which is in mesh with a larger gear 34. The gear 34 has mounted for rotation therewith a smaller gear 35 shown in dotted lines in Figure 4, which is in mesh with a larger gear 36. The gear 36 has mounted for rotation therewith a smaller gear 37, shown in dotted lines in Figure 4, which is in turn in mesh with a substantially larger gear 38. The gear 38 has secured thereto, as best seen in Figure 6, a vertical sleevelike member 40 which surrounds a cylindrical shaftlike element 41. Mounted upon the element or support 41 is a light source generally indicated by the numeral 42. 43 indicates a pair of wires leading from the light source 42 to any suitable source of electrical energy (not shown). Secured to the sleeve member 40, for rotation therewith, as by any suitable securing means such as that illustrated at 45, is a first concave reflector member 46 which is centrally apertured as at 47 to permit the passage therethrough of the stationary shaft 41 and the light socket member 42a. A bracket 50 may have a lower horizontal portion secured to the horizontally disposed reflector 46 and rotatable sleeve 40, as by the connecting means 45. The bracket 50 has an upwardly extending portion 51, to which is secured a vertically disposed second concave reflector member 52.

It will be realized that whereas we have described and illustrated a practical and operative device, nevertheless, many changes may be made in the size, shape, number and disposition of parts without departing from the spirit of our invention. We therefore wish our description and drawings to be taken as in a broad sense illustrative or diagrammatic, rather than as limiting us to our precise showing.

The use and operation of our inventon are as follows:

The provision of a streamlined lighting and signaling structure for aircraft permits the placement of a light source and light beam creating, moving and deflecting structure in position to be seen from a variety of locations without resulting in the creation of additional resistance to the movement of the aircraft through the air. Moreover, the provision of a lighting structure which may be installed on the wing tips of an aircraft and a streamlined housing therefor results in improved aerodynamic characteristics. Since the housing member of the lighting structure is generally hollow, its weight is negligible and the light source and light beam creating and moving element is similarly comprised of a minimum number of very light weight parts. The total structure creates no substantial increase in weight when installed on an aircraft. At the same time, the presence of the streamlined structure at the wing tips is effective to influence the flow of air about the wing tip in such a manner as to smooth it and thus to improve the aerodynamic characteristics of the total structure.

As to the operation of the lighting and signaling structure itself, it may be best understood from a view of Figures 1, 3 and 6. From a position above the aircraft the viewer sees a gyrating beam of light. The light emanating from the source 42 is reflected in the form of a beam by the upwardly directed reflector 46. While the angle of inclination from the horizontal reflector 46 may be very slight and, therefore, very difficult to determine easily from the showing in Figures 3 and 6, nonetheless it will be understood that the reflector 46 is so inclined from the horizontal so that as it rotates, the beam created thereby, which is at all times angularly diverted from the vertical axis of the light source 42, will appear to the observer to be following a gyratory pattern.

As the reflector 52 rotates about the light source 42 with the reflector 46, in response to rotation of the gear 38, the light beam created by the reflector 52 will sweep in a horizontal plane throughout an arc of 180 degrees extending from a point generally directly ahead of the housing member 3 to a point generally directly to the rear of the housing member 3. It will be realized that a similar structure is installed on the opposite wing tip of the aircraft with the transparent housing portion on the outside and that a similar light moving structure will create a beam of light moving through a horizontal arc of 180 degrees in the opposite direction so that there is in fact a 360-degree coverage of horizontally moving light beams about the aircraft.

As the reflector 52 continues its rotation in either direction beyond the arc of 180 degrees above described, the beam of light created thereby will impinge upon the longitudinal reflector member 12 which runs the length of the inner housing element 8. As is best seen in Figure 3, the horizontal axis of the light source 42 and the point of convergence of the inclined reflector portions 14, 15 of the member 12 are in horizontal axial alignment. It is therefore clear, as indicated in dotted lines in Figure 3, that the beam created by the reflector 52 will, during a portion of the rotation of the reflector, impinge upon both the upper and lower inclined reflector surfaces 16, 17. The reflector surface 16 will, therefore, reflect a portion of the light beam upwardly and outwardly through the housing element 9, as shown in dotted lines at A in Figure 3. Similarly, the reflector surface 17 will reflect downwardly and outwardly through the housing element 9 the remaining portion of the light beam as indicated at B in Figure 3. While the reflector member 12 is effective to produce a particular light pattern, a variety of variously shaped reflectors could be employed and under certain circumstances no reflector might be employed, without departing radically from the nature and scope of our invention.

Since the housing element 8 extends upwardly above the wing section 1 to the center line of the housing 3, and since the light source 42 is positioned well beneath the top longitudinal edge of the housing element 8, it will be clear that the light emanating therefrom will at no time be reflected into the eyes of the pilot, crew or passengers in the aircraft.

We claim:

1. A lighting and signaling structure for aircraft including a housing adapted for attachment to an aircraft wing tip, said housing having an overall, elongated, streamlined configuration, said housing being formed of a pair of longitudinal shell-like inner and outer members, said outer member being formed of light-permeable material, a light source fixed within said outer member at a point intermediate its ends, a reflector movably mounted adjacent said light source within said outer member and means within said outer member for moving said reflector about said light source and a second reflector fixed within said housing and positioned to reflect light from said light source outwardly through said outer member in a plurality of directions, said second reflector being positioned to receive a beam of light from said first reflector during a portion of the travel of said first reflector about said light source and to direct said last named beam of light through said outer member in a plurality of directions.

2. A lighting and signaling structure for aircraft including a housing, said housing being formed of an inner opaque shell and an outer translucent shell, a light source within said outer shell, a reflector movably mounted within said outer shell, means within said outer shell for moving said reflector about said light source and a second reflector fixed within said housing and positioned to reflect light from said light source outwardly through said outer shell in a plurality of directions, said second reflector being positioned to receive a beam of light from said first reflector during a portion of the travel of said first reflector and to direct said last named beam of light through said outer shell in a plurality of directions, said second reflector extending between oppositely disposed portions of the wall of said housing to divide said housing into two portions, one of said housing portions including said outer shell in its entirety, said second reflector having portions inclined in relation to the path of said light beam from said first reflector to said second reflector.

3. A lighting and signaling structure for aircraft comprising a housing having an elongated streamlined configuration, said housing being formed of an inner longitudinally extending opaque shell and an outer longitudinally extending translucent shell, a light source fixed within said outer shell at a point intermediate its ends, a reflector rotatably mounted adjacent said light source within said outer shell and means within said outer shell for rotating said reflector about said light source, a second reflector fixed within said housing and positioned to reflect light from said light source outwardly through said outer shell in a plurality of directions, said second reflector being positioned to receive a beam of light from said first reflector during a portion of the rotation of said first reflector about said light source and to direct said last named beam of light through said outer shell in a plurality of directions, said second reflector extending throughout the length of said opaque shell and being secured to the longitudinally extending edge portions of said inner shell to divide said housing into two portions, one of said housing portions including said outer shell in its entirety, said second reflector having portions inclined in relation to the axis of rotation of said first reflector.

References Cited in the file of this patent

UNITED STATES PATENTS

| | | | |
|---|---|---|---|
| 1,548,958 | Sperry | Aug. 11, | 1925 |
| 1,683,580 | Ryder | Sept. 4, | 1928 |
| 1,946,379 | Ziesing | Feb. 6, | 1934 |
| 2,058,977 | Grimes | Oct. 27, | 1936 |
| 2,375,075 | Carruth | May 1, | 1945 |
| 2,571,158 | Orlansky | Oct. 16, | 1951 |
| 2,719,282 | Roth | Sept. 27, | 1955 |

FOREIGN PATENTS

| | | | |
|---|---|---|---|
| 350,673 | Great Britain | June 18, | 1931 |